United States Patent
Kamikado (10) Patent No.: US 7,837,281 B2
(45) Date of Patent: Nov. 23, 2010

(54) APPARATUS AND METHOD FOR MAINTAINING BRAKING FORCE OF VEHICLE

(75) Inventor: Masaru Kamikado, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1073 days.

(21) Appl. No.: 11/580,923

(22) Filed: Oct. 16, 2006

(65) Prior Publication Data

US 2007/0085417 A1   Apr. 19, 2007

(30) Foreign Application Priority Data

Oct. 14, 2005   (JP) ............... 2005-300513

(51) Int. Cl.
 *B60T 7/12* (2006.01)
(52) U.S. Cl. .................. 303/191; 303/192; 303/89
(58) Field of Classification Search .......... 303/89, 303/191, 192; 188/265
 See application file for complete search history.

(56) References Cited

U.S. PATENT DOCUMENTS

| | | | |
|---|---|---|---|
| 5,979,619 A | | 11/1999 | Rump |
| 6,193,332 B1 | * | 2/2001 | Ono ................ 303/191 |
| 6,332,654 B1 | * | 12/2001 | Yano ................ 303/89 |
| 7,401,872 B2 | * | 7/2008 | Kinder et al. ........ 303/191 |

FOREIGN PATENT DOCUMENTS

| | | |
|---|---|---|
| JP | 8-142819 | 6/1996 |
| JP | 10-24817 | 1/1998 |

* cited by examiner

*Primary Examiner*—Bradley T King
(74) *Attorney, Agent, or Firm*—Buchanan Ingersoll & Rooney PC

(57) ABSTRACT

A braking force maintaining apparatus of a vehicle includes a reference braking force setting section, a threshold value setting section, a braking force change rate detecting section, and a change rate determining section. The reference braking force setting section sets, as a reference braking force, a braking force acting on wheels of the vehicle after a reference time has elapsed since stopping of the vehicle. The threshold value setting section sets a threshold value by adding the reference braking force to a predetermined reference value. The braking force change rate detecting section detects a change rate of the braking force acting on the wheels after the threshold value has been set. The change rate determining section determines whether the detected change rate is a negative value. If the detected change rate is a negative value, the reference braking force setting section resets, as the reference braking force, the braking force acting on the wheels after the threshold value has been set, and the threshold value setting section resets the threshold value by adding the reset reference braking force to the reference value.

16 Claims, 7 Drawing Sheets

APPARATUS AND METHOD FOR MAINTAINING BRAKING FORCE OF VEHICLE

CROSS REFERENCE TO RELATED APPLICATIONS

This application is based on and claims priority under 35 U.S.C. sctn. 119 with respect to Japanese Patent Application No. 2005-300513 filed on Oct. 14, 2005, the entire content of which is incorporated herein by reference.

BACKGROUND OF THE INVENTION

The present invention relates to an apparatus and a method for maintaining braking force acting on the wheels of a vehicle that has been stopped through depression of a brake pedal even after the brake pedal is released from depression.

Generally, if the brake pedal of a vehicle is released from depression when the vehicle is stopped on an inclined surface such as a slope, braking force acting on each of the wheels quickly drops, causing undesired downward movement (sliding) of the vehicle along the inclined surface. This may prevent the driver from smoothly re-starting the vehicle. To avoid this, an apparatus and a method for maintaining braking force of a vehicle involving hill-hold control have been proposed (as described in, for example, Japanese Laid-Open Patent Publication No. 10-24817). Through the hill-hold control, undesired movement of the vehicle is suppressed by maintaining braking force acting on the wheels of a stopped vehicle even after the brake pedal is released from depression.

Figure 8:
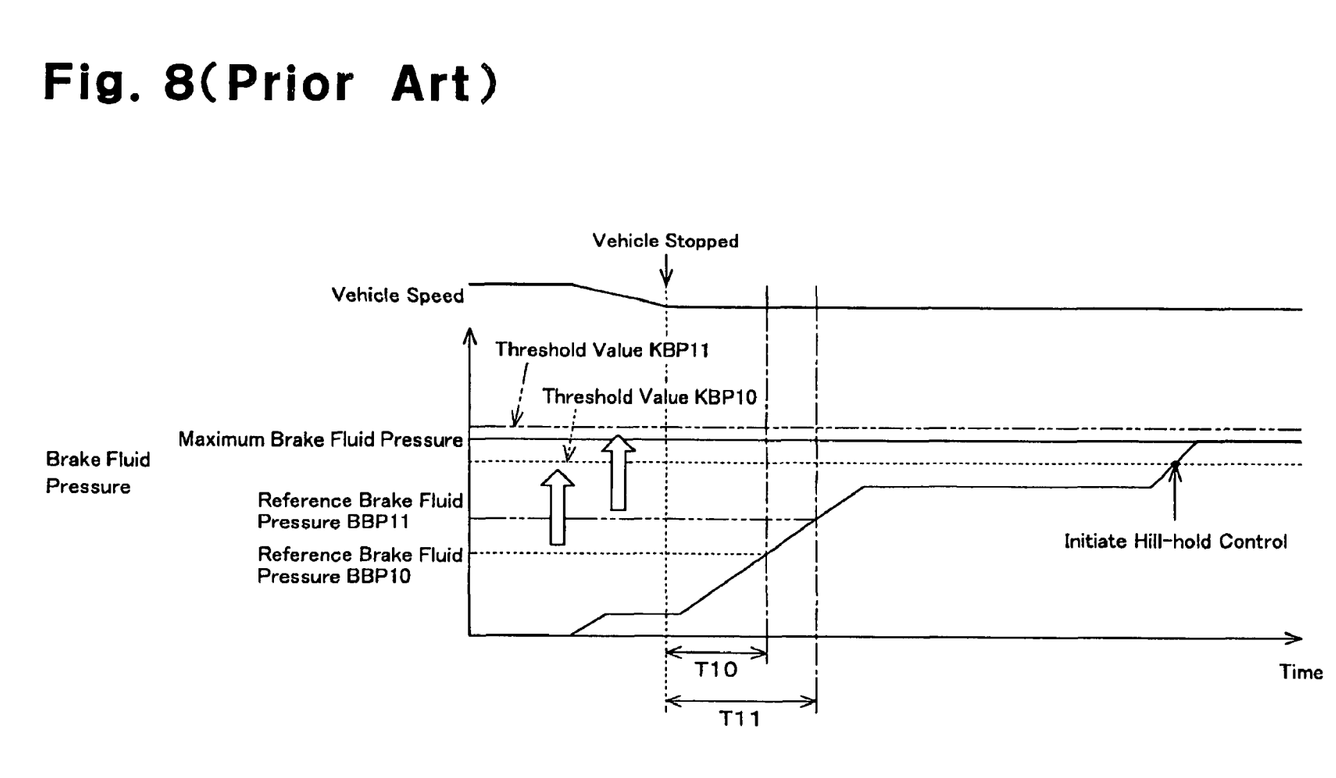
FIG. 8 is a timing chart representing operation of a typical braking force maintaining apparatus of a vehicle.

Specifically, as illustrated in FIG. 8, in the braking force maintaining apparatus of a vehicle described in Japanese Laid-Open Patent Publication No. 10-24817, a RAM memorizes brake fluid pressure of each of wheel cylinders (braking means) at reference time T10 as reference brake fluid pressure BBP10, after the vehicle is stopped through depression of the brake pedal. A predetermined reference value is added to the reference brake fluid pressure BBP10 to obtain a threshold value KBP10. The threshold value KBP10 is stored in the RAM. Afterwards, if the braking pedal is further depressed and the brake fluid pressure in the hydraulic circuit becomes greater than or equal to the threshold value KBP10, the fluid pressure in each wheel cylinder is maintained so as to maintain the braking force applied to the wheels by the wheel cylinders.

However, since the threshold value is set based on the brake fluid pressure in each wheel cylinder at a reference time after the vehicle is stopped, there may be cases where hill-hold control cannot be initiated regardless of further depression of the brake pedal. In other words, as illustrated in FIG. 8, if the reference time is set to a relatively great value, or a reference time T11, the brake fluid pressure in each wheel cylinder at the reference time T11 (a reference brake fluid pressure BBP11) becomes relatively high. This correspondingly increases the resulting threshold value KBP11. In this case, regardless of further depression of the brake pedal intended to initiate the hill-hold control, the brake fluid pressure of each wheel cylinder may remain smaller than the threshold value KBP11. The hill-hold control thus cannot be initiated.

SUMMARY OF THE INVENTION

Accordingly, it is an objective of the present invention to provide an apparatus and a method for maintaining braking force of a vehicle that ensure initiation of hill-hold control in response to depression of a brake pedal intended to start such control.

To achieve the foregoing objectives and in accordance with one aspect of the present invention, an apparatus for maintaining a braking force of a vehicle is provided. The apparatus includes a reference braking force setting section, a threshold value setting section, a braking force determining section, a control section, a braking force change rate detecting section, and a change rate determining section. The reference braking force setting section sets, as a reference braking force, a braking force applied by a braking section to wheels of the vehicle after a reference time has elapsed since stopping of the vehicle through application of the braking force to the wheels by the braking section. The threshold value setting section sets a threshold value by adding the reference braking force to a predetermined reference value. The braking force determining section determines whether the braking force applied by the braking section to the wheels through depression of a braking pedal of the vehicle after setting of the threshold value has become greater than or equal to the threshold value. The control section controls operation of the braking section in such a manner that, when the determination of the braking force determining section is positive, the braking force acting on the wheels is maintained for preventing rotation of the wheels regardless of release of the brake pedal from the depression. The braking force change rate detecting section detects a change rate of the braking force applied by the braking section to the wheels after the threshold value has been set. The change rate determining section determines whether the change rate detected by the braking force change rate detecting section is a negative value. If the determination of the change rate determining section is positive, the reference braking force setting section resets, as the reference braking force, the braking force applied by the braking section to the wheels after the threshold value has been set, and the threshold value setting section resets the threshold value by adding the reference braking force that has been reset by the reference braking force setting section to the reference value.

In accordance with another aspect of the present invention, a method for maintaining a braking force of a vehicle is provided. The method includes: setting a braking force acting on wheels of the vehicle after a reference time has elapsed since stopping of the vehicle through application of the braking force to the wheels as a reference braking force; setting a threshold value by adding the reference braking force to a predetermined reference value; determining whether the braking force acting on the wheels through depression of a brake pedal of the vehicle after setting of the threshold value has become greater than or equal to the threshold value, wherein, if the determination is positive, the braking force acting on the wheels is maintained for preventing rotation of the wheels regardless of release of the brake pedal from the depression; and detecting a change rate of the braking force acting on the wheels after setting of the threshold value and determining whether the detected change rate is negative, wherein, if the determination is positive, the braking force acting on the wheels after setting of the threshold value is reset as the reference braking force and the threshold value is reset by adding the reset reference braking force to the reference value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 7. Hereafter, the advancing direction of a vehicle is referred to as a forward direction of the vehicle. Also, unless otherwise specified, a lateral direction coincide with the lateral direction with respect to the vehicle advancing direction.

Figure 1:
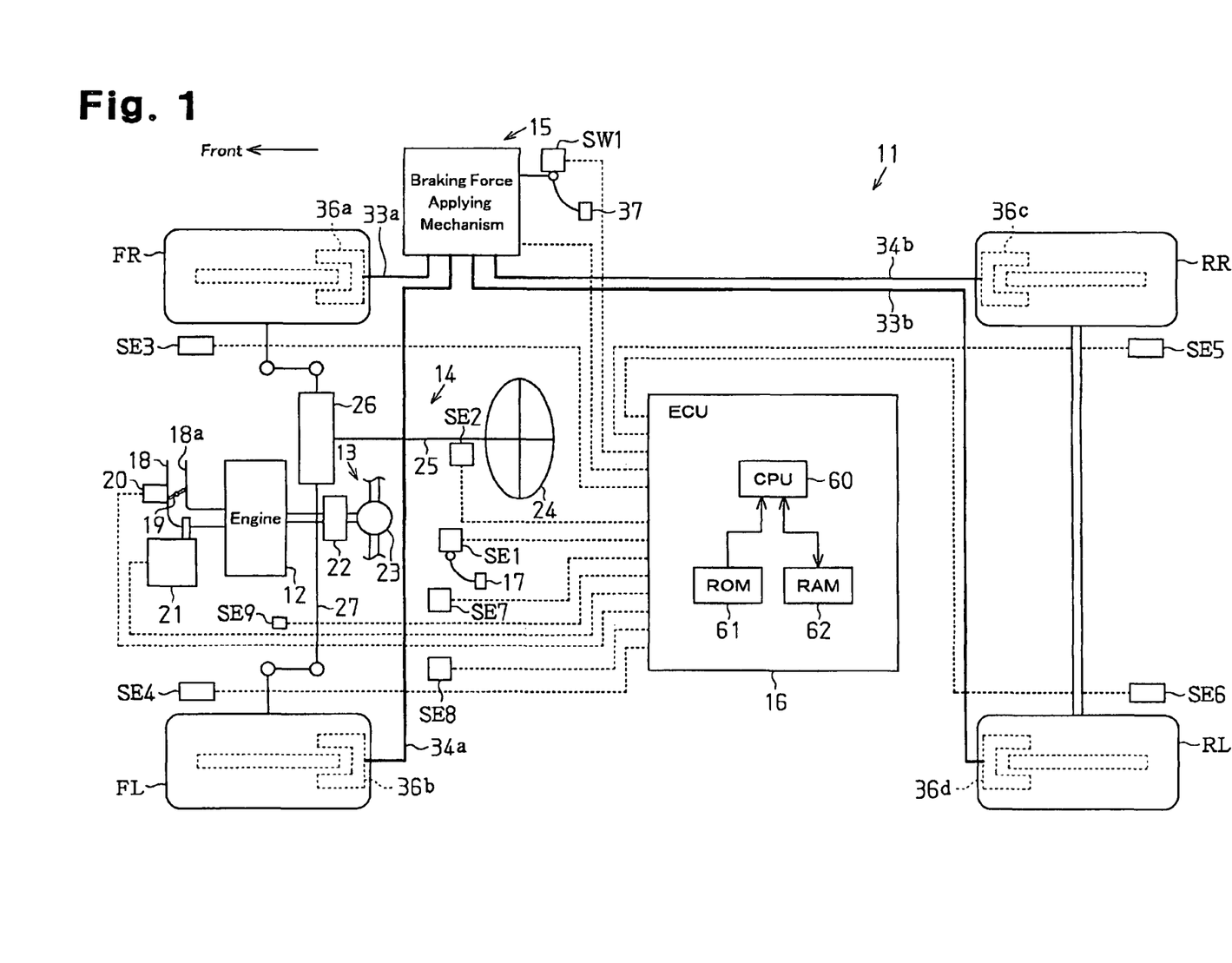
FIG. 1 is a block diagram representing a braking force maintaining apparatus of a vehicle according to an embodiment of the present invention.

As illustrated in FIG. 1, a braking force maintaining apparatus 11 of a vehicle of the illustrated embodiment is provided in a front-wheel-drive vehicle. Specifically, the vehicle has a plurality of wheels (in the illustrated embodiment, four wheels, or a right front wheel FR, a left front wheel LF, a right rear wheel RR, and left rear wheel RL). The front wheels FR, FL function as the drive wheels of the vehicle. The braking force maintaining apparatus 11 has a power transmission mechanism 13, a front wheel steering mechanism 14, and a braking force applying mechanism 15. The power transmission mechanism 13 transmits power of an engine 12, or a drive source, to the front wheels FR, FL. The front wheel steering mechanism 14 operates to steer the front wheels FR, FL as steered wheels. The braking force applying mechanism 15 applies braking force to the wheels FR, FL, RR, RL. The braking force maintaining apparatus 11 also includes an electronic control unit (referred to as "ECU") 16 that controls operation of the mechanisms 13, 14, 15 in correspondence with a traveling state of the vehicle. The engine 12 generates power in correspondence with depression of an accelerator pedal 17 by the driver of the vehicle.

The power transmission mechanism 13 has a throttle valve actuator 20 (for example, a DC motor) and a fuel injection device 21. The throttle valve actuator 20 adjusts the opening degree of a throttle valve 19, which changes the cross-sectional area of an intake passage 18a of an intake pipe 18. The fuel injection device 21 has injectors injecting fuel into areas in the vicinity of intake ports (not shown) of the engine 12. The power transmission mechanism 13 also has a transmission 22 and a differential gear 23. The transmission 22 is connected to the output shaft of the engine 12. The differential gear 23 appropriately distributes the power, which has been transmitted by the transmission 22, to the front wheels FL, FR. An accelerator opening degree sensor SE1 is also provided in the power transmission mechanism 13 and detects the amount of depression (the accelerator opening degree) of the accelerator pedal 17.

The front wheel steering mechanism 14 has a steering wheel 24, a steering shaft 25 to which the steering wheel 24 is fixed, and a steering actuator 26 connected to the steering shaft 25. The front wheel steering mechanism 14 also includes a link mechanism 27 having tie rods and a link. The tie rods are moved by the steering actuator 26 in the lateral direction of the vehicle. This causes the link of the link mechanism 27 to steer the front wheels FL, FR. A steering angle sensor SE2 is provided in the front wheel steering mechanism 14 and detects the steering angle of the steering wheel 24.

The braking force applying mechanism 15 will hereafter be explained with reference to FIG. 2.

Figure 2:
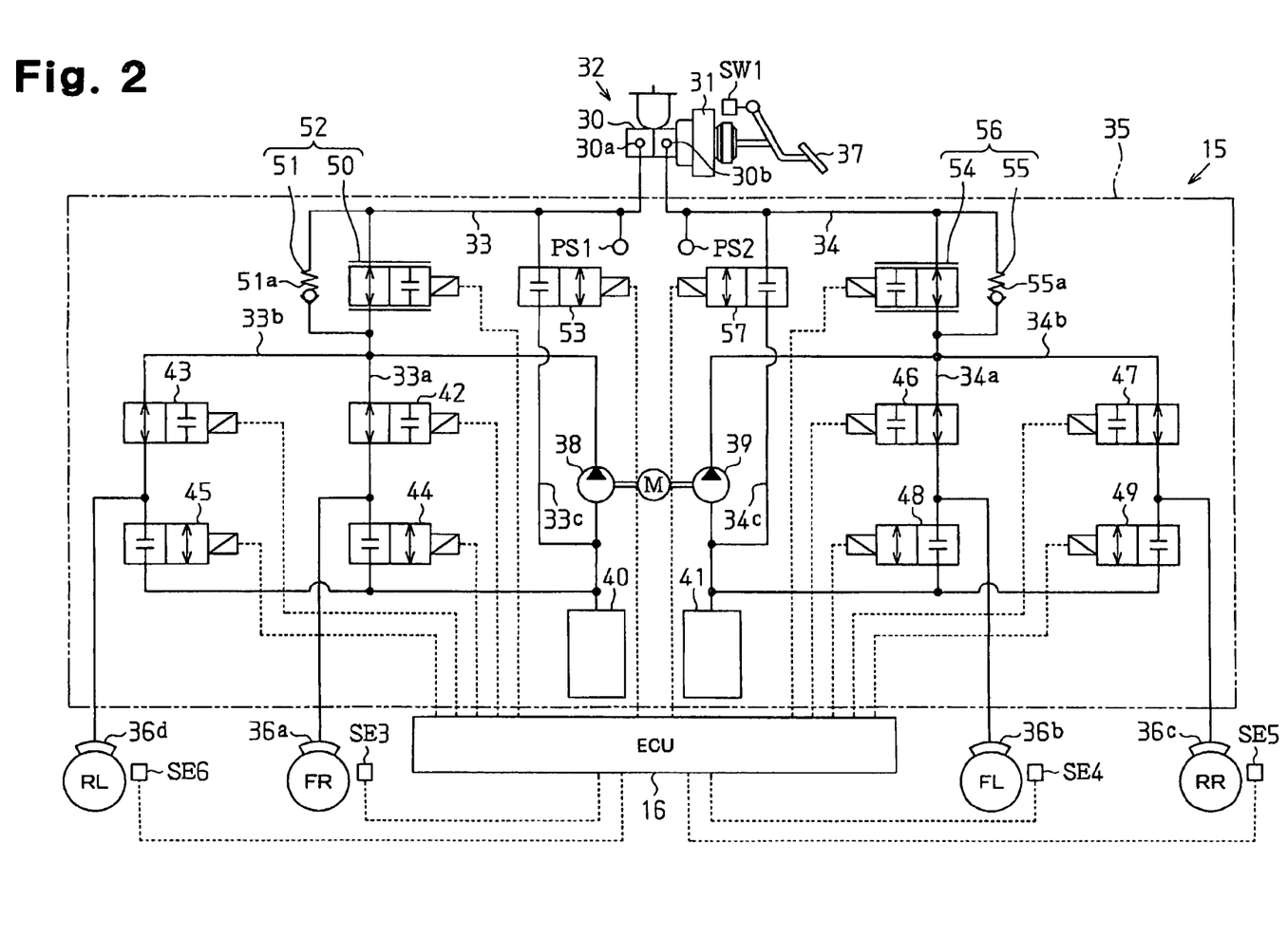
FIG. 2 is a block diagram representing a braking force applying mechanism of the illustrated embodiment.

As illustrated in FIG. 2, the braking force applying mechanism 15 has a fluid pressure generating device 32 including a master cylinder 30 and a booster 31, and a fluid pressure control section 35 (indicated by the alternate long and two short dashes lines of FIG. 2) including two hydraulic circuits 33, 34. The hydraulic circuits 33, 34 are each connected to the fluid pressure generating device 32. The first hydraulic circuit 33 is connected to wheel cylinders 36a 36d. The second hydraulic circuit 34 is connected to wheel cylinders 36b, 36c. The wheel cylinders 36a to 36d are provided in correspondence with the wheels FR, FL, RR, RL. Specifically, the wheel cylinder 36a corresponds to the right front wheel FR and the wheel cylinder 36b corresponds to the left front wheel FL. The wheel cylinder 36c corresponds to the right rear wheel RR and the wheel cylinder 36d corresponds to the left rear wheel RL. The wheel cylinders 36a to 36d function as a braking section (braking means) that apply the braking force to the wheels FR, FL, RR, RL.

The fluid pressure generating device 32 includes a brake pedal 37. When the brake pedal 37 is depressed by the driver, the master cylinder 30 and the booster 31 of the fluid pressure generating device 32 are activated. The master cylinder 30 has two output ports 30a, 30b. The output port 30a is connected to the first hydraulic circuit 33, and the output port 30b is connected to the second hydraulic circuit 34. Further, the fluid pressure generating device 32 includes a brake switch SW1, which sends a signal to the electronic control unit 16 when the brake pedal 37 is depressed.

The fluid pressure control section 35 includes a pump 38 for increasing the brake fluid pressure in the first hydraulic circuit 33, a pump 39 for increasing the brake fluid pressure in the second hydraulic circuit 34, and a motor M for simultaneously driving the pumps 38, 39. Reservoirs 40, 41 for storing brake fluid are provided on the hydraulic circuits 33, 34, respectively. Brake fluid in the reservoirs 40, 41 is supplied to the hydraulic circuits 33, 34 in response to the activation of the pumps 38, 39. Further, the hydraulic circuits 33, 34 have fluid pressure sensors PS1, PS2 for detecting the brake fluid pressure in the master cylinder 30, respectively.

The first hydraulic circuit 33 has a right front wheel path 33a and a left rear wheel path 33b. The right front wheel path 33a is connected to the wheel cylinder 36a corresponding to the right front wheel FR. The left rear wheel path 33b is connected to the wheel cylinder 36d corresponding to the left rear wheel RL. A normally open electromagnetic valve 42 and a normally closed electromagnetic valve 44 are provided on the right front wheel path 33a. A normally open electromagnetic valve 43 and a normally closed electromagnetic valve 45 are provided on the left rear wheel path 33b.

Likewise, the second hydraulic circuit 34 has a left front wheel path 34a and a right rear wheel path 34b. The left front wheel path 34a is connected to the wheel cylinder 36b corresponding to the left front wheel FL. The right rear wheel path 34b is connected to the wheel cylinder 36c corresponding to the right rear wheel RR. A normally open electromagnetic valve 46 and a normally closed electromagnetic valve 48 are provided on the left front wheel path 34a. A normally open electromagnetic valve 47 and a normally closed electromagnetic valve 49 are provided on the right rear wheel path 34b.

A normally open proportional electromagnetic valve 50 and a relief valve 51 parallel to the proportional electromagnetic valve 50 are provided in a section of the first hydraulic circuit 33 that is closer to the master cylinder 30 than the branched portion of the paths 33a, 33b. The proportional electromagnetic valve 50 and the relief valve 51 form a proportional differential pressure valve 52. In response to control by the electronic control unit 16, the proportional differential pressure valve 52 generates a fluid pressure difference (difference of the brake fluid pressure) between a section of the first hydraulic circuit 33 closer to the master cylinder 30 than the proportional differential pressure valve 52 and a section of the first hydraulic circuit 33 closer to the wheel cylinders 36a, 36d than the proportional differential pressure valve 52. The maximum value of the fluid pressure difference is determined based on the urging force of a spring 51a of the relief valve 51. The first hydraulic circuit 33 includes a branch hydraulic circuit 33c, which is branched from a section between the reservoir 40 and the pump 38 toward the master cylinder 30. A normally closed electromagnetic valve 53 is provided in the branch hydraulic circuit 33c.

A normally open proportional electromagnetic valve 54 and a relief valve 55 parallel to the proportional electromagnetic valve 54 are provided in a section of the second hydraulic circuit 34 that is closer to the master cylinder 30 than the branched portion of the paths 34a, 34b. The proportional electromagnetic valve 54 and the relief valve 55 form a proportional differential pressure valve 56. In response to control by the electronic control unit 16, the proportional differential pressure valve 56 generates a fluid pressure difference (difference of the brake fluid pressure) between a section of the second hydraulic circuit 34 closer to the master cylinder 30 than the proportional differential pressure valve 56 and a section of the second hydraulic circuit 34 closer to the wheel cylinders 36b, 36c than the proportional differential pressure valve 52. The maximum value of the fluid pressure difference is determined based on the urging force of a spring 55a of the relief valve 55. The second hydraulic circuit 34 includes a branch hydraulic circuit 34c, which is branched from a section between the reservoir 41 and the pump 39 toward the master cylinder 30. A normally closed electromagnetic valve 57 is provided in the branch hydraulic circuit 34c.

Changes in the brake fluid pressure in each of the wheel cylinders 36a to 36d will now be described in cases where the solenoid coils of the electromagnetic valves 42 to 49 are energized and de-energized. In the following description, the proportional electromagnetic valves 50, 54 are assumed to be closed, and the electromagnetic valves 53, 57 in the branch hydraulic circuits 33c, 34c are assumed to be closed.

When all the solenoid coils of the electromagnetic valves 42 to 49 are de-energized, the normally open electromagnetic valves 42, 43, 46, 47 remain open, and the normally closed electromagnetic valves 44, 45, 48, 49 remain closed. Therefore, while the pumps 38, 39 are operating, the brake fluid in the reservoirs 40, 41 flows to the wheel cylinders 36a to 36d through the paths 33a, 33b, 34a, 34b, so that the brake fluid pressure in the wheel cylinders 36a to 36d is increased.

On the other hand, when all the solenoid coils of the electromagnetic valves 42 to 49 are energized, the normally open electromagnetic valves 42, 43, 46, 47 are closed, and the normally closed electromagnetic valves 44, 45, 48, 49 are opened. Therefore, the brake fluid flows from the wheel cylinders 36a to 36d to the reservoirs 40, 41 through the paths 33a, 33b, 34a, 34b, so that the brake fluid pressure in the wheel cylinders 36a to 36d is lowered.

When the solenoid coils of only the normally open electromagnetic valves 42, 43, 46, 47 among the electromagnetic valves 42 to 49 are energized, all the electromagnetic valves 42 to 49 are closed. Therefore, the flow of brake fluid through the paths 33a, 33b, 34a, 34b is limited. As a result, the level of the brake fluid pressure in the wheel cylinders 36a to 36d is maintained.

With reference to FIG. 1, the ECU 16 is configured mainly by a digital computer including a CPU 60, or a control section (control means), a ROM 61, and a RAM 62 and a driver circuit (not shown) that drives various devices. The ROM 61 stores a control program for controlling operation of the fluid pressure control section 35 (actuation of the motor M, the electromagnetic valves 42 to 49, 53, 57 and the proportional electromagnetic valves 50, 54) and a map for setting minimum brake fluid pressure in the wheel cylinders 36a to 36d (see FIG. 3), which will be explained later. The RAM 62 stores various types of information (including threshold values), which is rewritten when necessary in operation of the braking force maintaining apparatus 11 of the vehicle.

The brake switch SW1, the fluid pressure sensors PS1, PS2, the accelerator opening degree sensor SE1, and the steering angle sensor SE2 are connected to an input interface (not shown) of the ECU 16. Wheel speed sensors SE3, SE4, SE5, SE6 and a lateral G sensor SE7 are also connected to the input interface of the ECU 16. The wheel speed sensors SE3, SE4, SE5, and SE6 detect the speeds of the wheels FR, FL, RR, and RL, respectively. The lateral G sensor SE7 detects actual lateral acceleration (lateral G) acting on the vehicle. Further, a yaw rate sensor SE8 and a vehicle acceleration sensor (a fore-and-rear G sensor) SE9 are connected to the input interface of the ECU 16. The yaw rate sensor SE8 detects the actual yaw rate of the vehicle. The vehicle acceleration sensor SE9 detects the acceleration of the vehicle. The CPU 60 thus receives signals from the brake switch SW1, the fluid pressure sensors PS1, PS2, and the sensors SE1 to SE9.

The motor M, which operates to actuate the pumps 38, 39, the electromagnetic valves 42 to 49, 53, 57, and the proportional electromagnetic valves 50, 54 are connected to an output interface (not shown) of the ECU 16. In correspondence with signals input by the switch SW1 and the sensors PS1, PS2, SE1 to SE9, the CPU 60 separately controls operation of the motor M, the electromagnetic valves 42 to 49, 53, 57, and the proportional electromagnetic valves 50, 54.

The map stored by the ROM 61 will now be explained with reference to FIG. 3.

Figure 3:
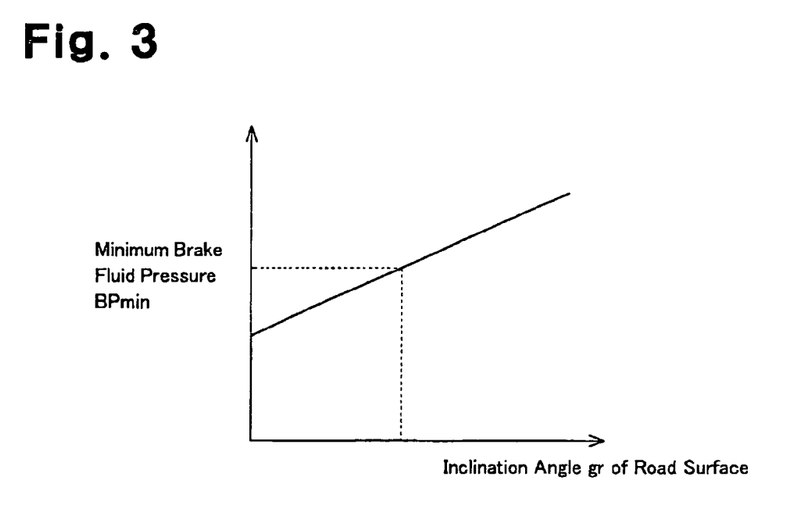
FIG. 3 is a map representing the relationship between the inclination angle of a road surface and the minimum brake fluid pressure.

The map of FIG. 3 represents the relationship between the inclination angle gr of a road surface on which the vehicle is stopped and minimum brake fluid pressure (minimum braking force) BPmin, which is minimum brake fluid pressure of each of the wheel cylinders 36a to 36d (braking force applied to the wheels FL, FR. RL, RR by the braking section) necessary for stopping the vehicle in correspondence with the inclination angle gr. The minimum brake fluid pressure BPmin rises as the inclination angle gr of the road surface increases. In other words, the minimum brake fluid pressure BPmin varies proportionally to the inclination angle gr of the road surface.

Figure 4:
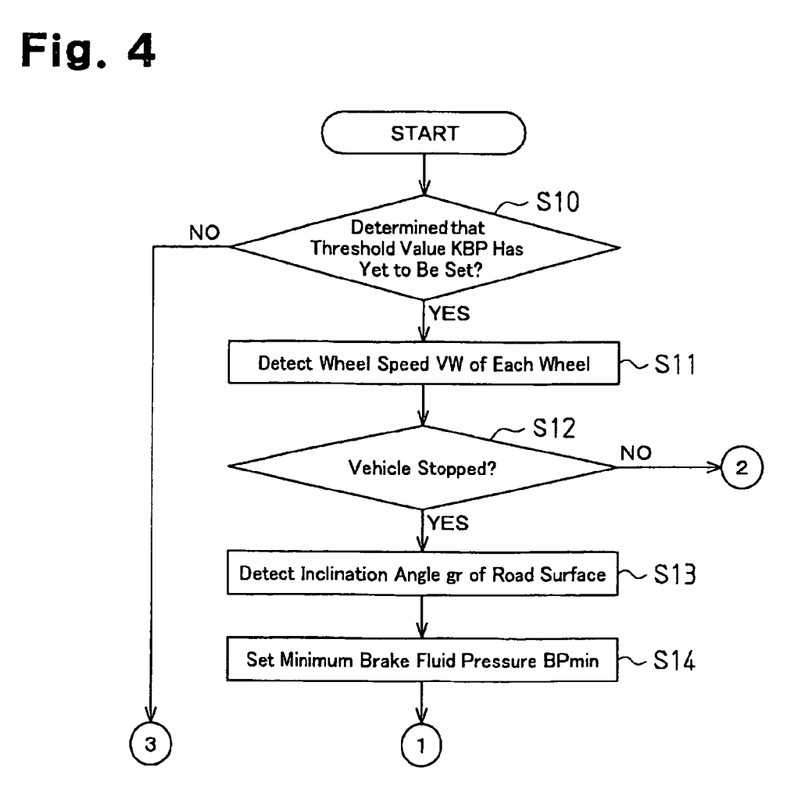
FIG. 4 is a first half of a flowchart representing a threshold value setting routine.
Figure 5:
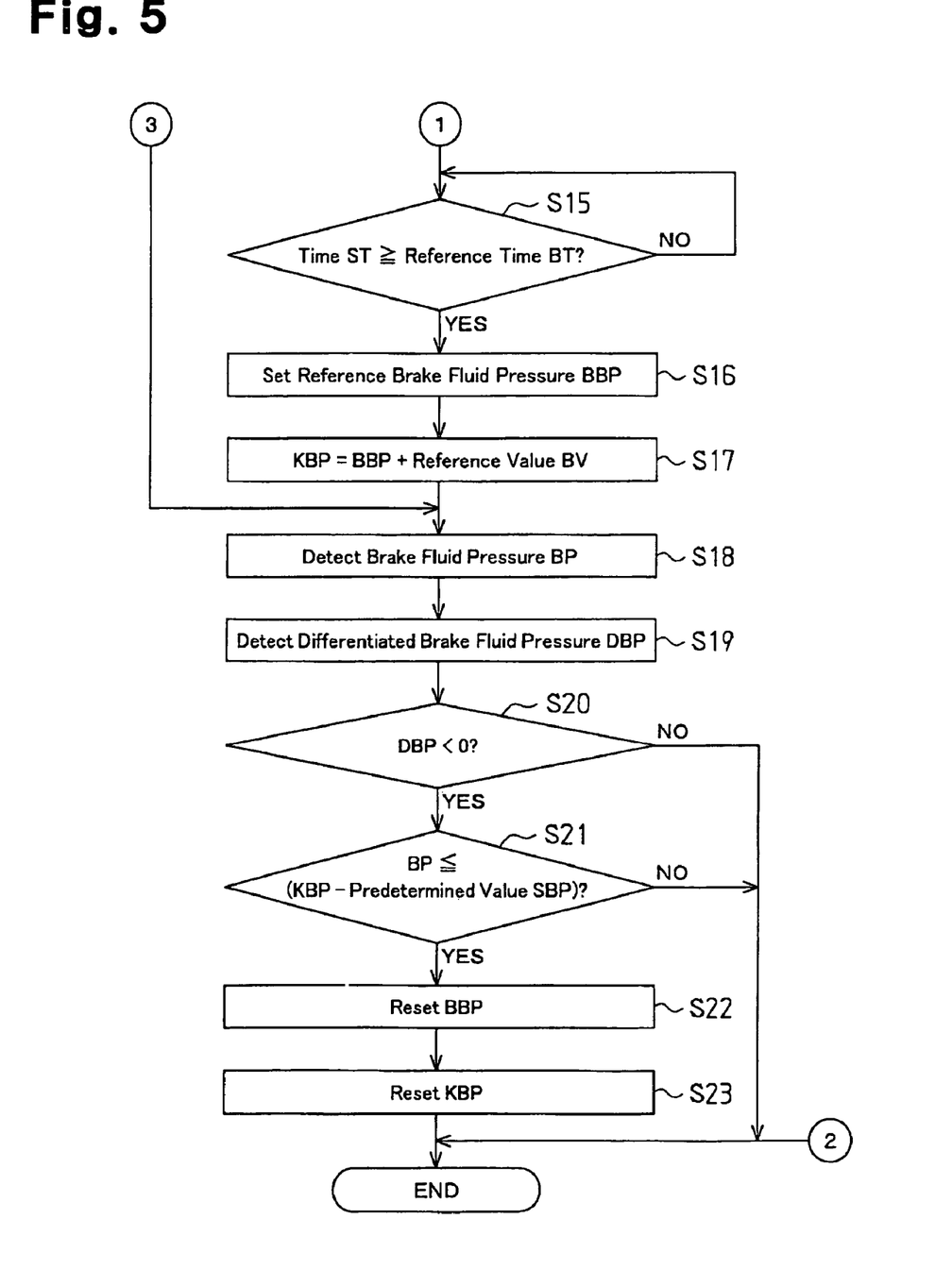
FIG. 5 is a second half of the flowchart representing the threshold value setting routine.
Figure 6:
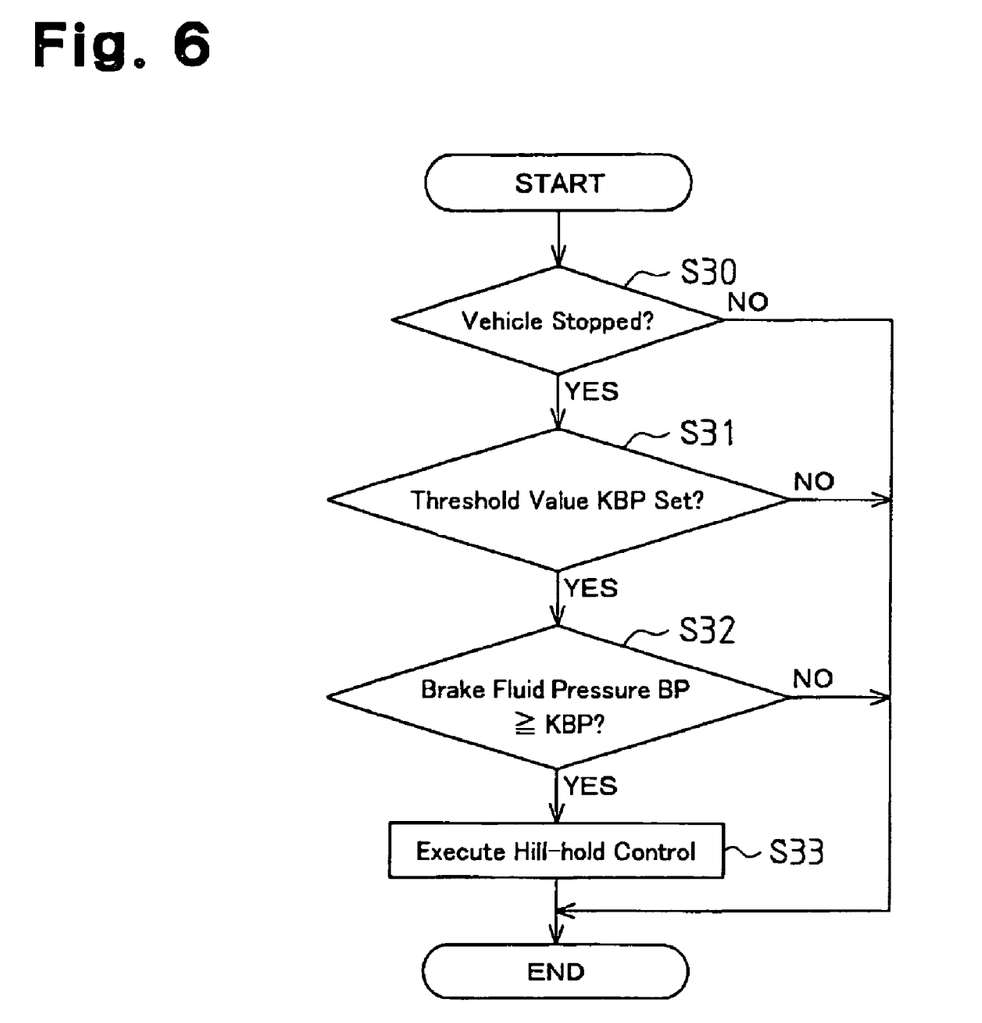
FIG. 6 is a flowchart representing a hill-hold control routine.
Figure 7:
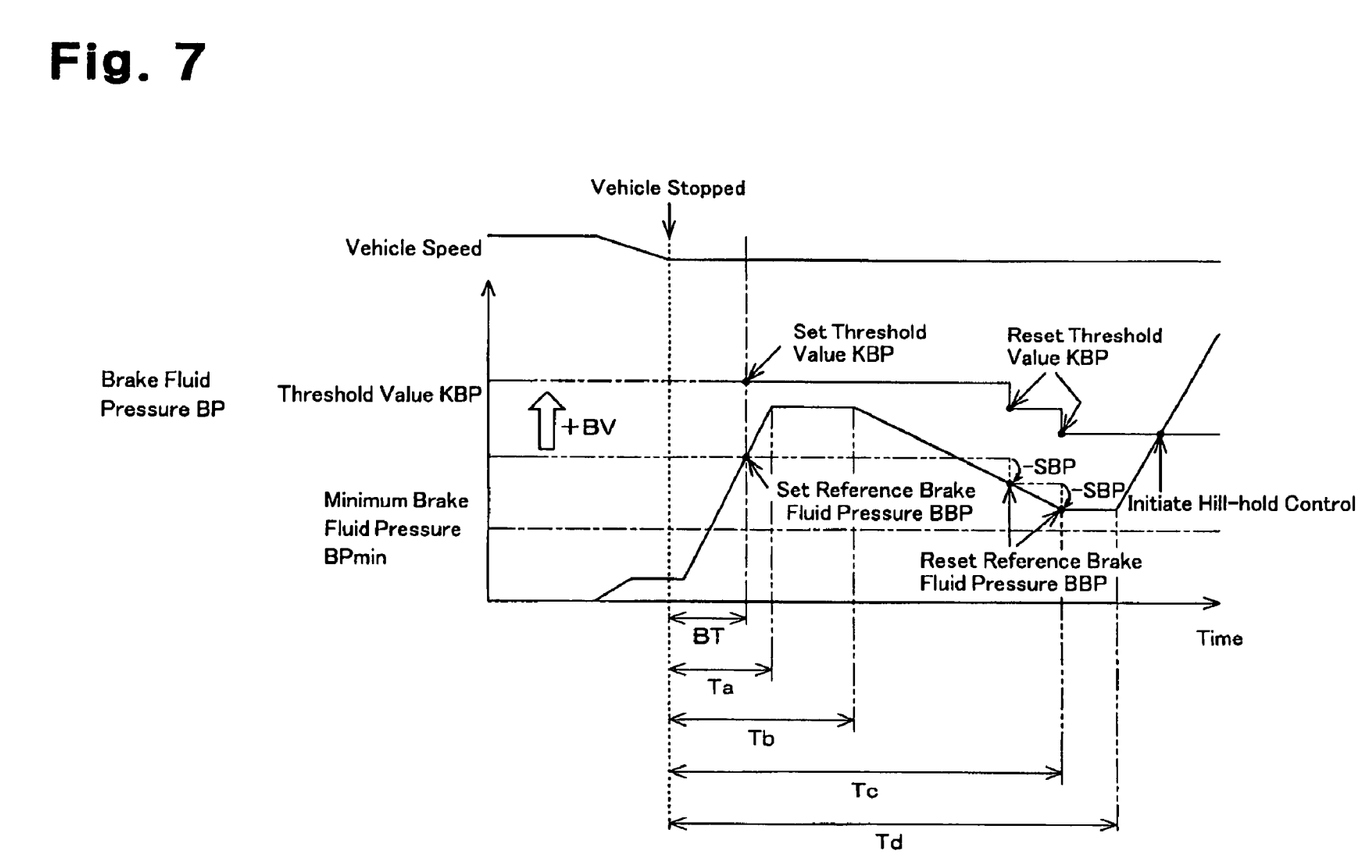
FIG. 7 is a timing chart representing variation of brake fluid pressure in each of wheel cylinders in correspondence with depression of a brake pedal.

Control routines executed by the CPU 60 of the illustrated embodiment will hereafter be explained with the flowchart of FIGS. 4, 5, and 6 and the timing chart of FIG. 7. FIGS. 4 and 5 represents a threshold value setting routine for setting a threshold value, which is a reference value for initiating hill-hold control, which will be explained later. FIG. 6 represents a hill-hold control routine for determining whether to start the hill-hold control.

The threshold value setting routine of FIGS. 4 and 5 will first be described.

After having received a signal from the brake switch SW1, the CPU 60 performs the threshold value setting routine at predetermined cycles. In the routine, the CPU 60 determines whether a threshold value KBP, a reference value for initiating the hill-hold control, has yet to be set (in step S10). If the determination of step S10 is negative, the CPU 60 determines that the threshold value KBP has been set, and carries out step S18, which will be explained later.

If the determination of step S10 is positive, the CPU 60 determines that the threshold value BP has yet to be set, and detects the wheel speed VW of each of the wheels FL, FR, RL, RR in correspondence with the signal of the corresponding one of the wheel speed sensors SE3 to SE6 (in step S11). The CPU 60 then determines whether the vehicle has been stopped (in step S12). Specifically, the CPU 60 determines whether the speed of the vehicle has become zero if, in step S11, the detected wheel speed VW of each wheel FL, FR, RL, RR is zero. If the determination of step S12 is negative, the CPU 60 determines that the speed of the vehicle is not zero, and suspends the threshold value setting routine.

If the determination of step S12 is positive, the CPU 60 determines that the speed of the vehicle has become zero, and detects the inclination angle gr of the road surface on which the vehicle has been stopped (in step S13). The inclination angle gr of the road surface is detected in correspondence with a signal of the vehicle acceleration sensor SE9. In this regard, the CPU 60 and the vehicle acceleration sensor SE9 of the illustrated embodiment function as a road surface inclination angle detecting section (road surface inclination angle detecting means). Subsequently, with reference to the map of FIG. 3, in step S14, the CPU 60 sets the minimum brake fluid pressure BPmin of each wheel cylinder 36a to 36d in correspondence with the inclination angle gr of the road surface that has been detected in step S13. In the illustrated embodiment, the CPU 60 thus functions also as a minimum braking force setting section (minimum braking force setting means) that sets the minimum brake fluid pressure of each wheel cylinder 36a to 36d (the minimum braking force applied to the wheels FL, FR, RL, RR by the braking section) necessary for stopping the vehicle on the road surface with the inclination angle gr, which has been detected in step S13, as the minimum brake fluid pressure (the minimum braking force) BPmin.

Next, the CPU 60 determines whether the time ST after the vehicle has been stopped has become greater than or equal to a reference time BT (for example, 0.8 seconds) (in step S15). The reference time BT is involved in setting of the reference brake fluid pressure BBP of each wheel cylinder 36a to 36d, which will be explained later. The reference value BT is a predetermined value obtained from a test or a simulation. If the determination of step S15 is negative (ST<BT), the determination is repeated until obtaining a positive determination. If the determination of step S15 is positive (ST≧BT), the CPU 60 detects the brake fluid pressure in each of the hydraulic circuits 33, 34 (the brake fluid pressure in each of the wheel cylinders 36a to 36d) in correspondence with signals of the fluid pressure sensors PS1, PS2, which are provided in the corresponding hydraulic circuits 33, 34. The CPU 60 then sets the detected brake fluid pressure BP as the reference brake fluid pressure (the reference braking force) BBP (in step S16), as indicated by the timing chart of FIG. 7. In this regard, the CPU 60 of the illustrated embodiment functions also as a reference braking force setting section (reference braking force setting means).

Subsequently, by adding the reference brake fluid pressure BBP, which has been set in step S16, and the predetermined reference value BV together, the CPU 60 sets the threshold value KBP (in step S17). In this regard, the CPU 60 of the illustrated embodiment functions also as a threshold value setting section (threshold value setting means). The CPU 60 then performs step S18.

In step S18, the CPU 60 detects the brake fluid pressure BP in each of the hydraulic circuits 33, 34 (the brake fluid pressure in each of the wheel cylinders 36a to 36d) after setting of the threshold value KBP, in correspondence with signals from the fluid pressure sensors PS1, PS2 of the hydraulic circuits 33, 34. The CPU 60 then detects a differentiated brake fluid pressure (a change rate of the brake fluid pressure BP) DBP by differentiating the brake fluid pressure BP (in step S19), which has been detected in step S18. The CPU 60 of the illustrated embodiment thus functions as a braking force change rate detecting section (a braking force change rate detection means) that detects the change rate of the brake fluid pressure BP of each wheel cylinder 36a to 36d (the braking force applied to the wheels FR, FL, RR, RL by the braking section) after setting of the threshold value KBP, or the differentiated brake fluid pressure DBP. Subsequently, the CPU 60 determines whether the differentiated brake fluid pressure DBP from step S19 is less than zero (in step S20). In this regard, the CPU 60 of the illustrated embodiment functions also as a change rate determining section (change rate determining means).

Specifically, if the amount of depression of the brake pedal 37 increases, the brake fluid pressure BP in each of the wheel cylinders 36a to 36d rises. In this case, the differentiated brake fluid pressure DBP becomes positive (DBP>0). For example, as indicated by FIG. 7, if the time ST after the vehicle has been stopped is greater than the reference time BT and smaller than or equal to the time Ta, the differentiated brake fluid pressure DBP becomes positive (DBP>0).

If the amount of depression of the brake pedal 37 is maintained constant, the brake fluid pressure BP in each wheel cylinder 36a to 36d is maintained constant. In this case, the differentiated brake fluid pressure DBP becomes zero. For example, as indicated by FIG. 7, if the time ST after stopping of the vehicle is greater than the time Ta and smaller than or equal to the time Tb, the differentiated brake fluid pressure DBP becomes zero.

If the amount of depression of the brake pedal 37 decreases, the brake fluid pressure BP in each of the wheel cylinders 36a to 36d drops. In this case, the differentiated brake fluid pressure DBP becomes negative (DBP<0). For example, as indicated by FIG. 7, if the time ST after the vehicle has been stopped is greater than the time Tb and smaller than or equal to the time Tc, the differentiated brake fluid pressure DBP becomes negative (DBP 0). In other words, through determination of step S20, the CPU 60 determines whether the amount of depression of the brake pedal 37 has decreased.

If the determination of step S20 is negative (DBP≧0), the CPU 60 suspends the threshold value setting routine. If the determination is positive (DBP<0), the CPU 60 determines whether the brake fluid pressure BP of each wheel cylinder 36a to 36d from step S18 is smaller than or equal to a value obtained by subtracting a predetermined value SBP (for example, 0.5 MPa) from the threshold value KBP (in step S21). The CPU 60 of the illustrated embodiment thus functions also as a braking force resetting determining section (braking force setting determining means). The predetermined value SBP is involved in resetting of the threshold value KBP and obtained in advance by a test or simulation.

If the determination of step S21 is negative (BP>(KBP−SBP)), the CPU 60 suspends the threshold value setting routine. If the determination is positive (BP≦(KBP−SBP)), the CPU 60 resets the brake fluid pressure BP of each wheel cylinder 36a to 36s from step S18 as the reference brake fluid pressure BBP (in step S22), as indicated by FIG. 7. Subsequently, referring to the timing chart, the CPU 60 resets the threshold value KBP by adding a reference value BV to the reset reference brake fluid pressure BBP of step S22 (in step S23). The CPU 60 then suspends the threshold value setting routine.

Next, a hill-hold control routine of FIG. 6 will be explained.

The CPU 60 executes the hill-hold control routine after having received a signal from the brake switch SW1. Specifically, the CPU 60 first determines whether the vehicle has been stopped by detecting the wheel speed VW of each of the wheels FL, FR, RL, RR in correspondence with signals from the wheel speed sensors SE3 to SE6 of the wheels FL, FR, RL, RR (in step S30). In other words, the CPU 60 determines whether the vehicle speed has become zero. If the determination of step S30 is negative, the CPU 60 suspends the hill-hold control routine.

If the determination of step S30 is positive, the CPU 60 determines whether the threshold value KBP has been set in the threshold value setting routine (in step S31). If the determination of step S31 is negative, the CPU 60 determines that the threshold value KBP has not yet be set, and suspends the hill-hold control routine. If the determination is positive, the CPU 60 determines that the threshold value KBP has been set, and detects the brake fluid pressure BP in each hydraulic circuit 33, 34 (the brake fluid pressure in each wheel cylinder 36a to 36d) in correspondence with signals from the fluid pressure sensors PS1, PS2 of the hydraulic circuits 33, 34. The CPU 60 then determines whether the detected brake fluid pressure BP of each wheel cylinder 36a to 36d is greater than or equal to the threshold value KBP (in step S32). If the determination of step S32 is negative (BP<KBP), the CPU 60 suspends the hill-hold control routine.

If the determination of step S32 is positive (BP≧KBP), the CPU 60 determines that the brake pedal 37 has been further depressed after the vehicle has been stopped and initiates hill-hold control (in step S33). Specifically, as indicated by FIG. 7, if the brake pedal 37 is further depressed after the time Td and the brake fluid pressure BP of each wheel cylinder 36a to 36d reaches or surpasses the threshold value KBP, the hill-hold control is started. In this regard, the CPU 60 of the illustrated embodiment functions as a braking force determining section (braking force determining means). The braking force determining section determines whether the brake fluid pressure BP in each wheel cylinder 36a to 36d (the braking force applied to the wheels FL, FR, RL, RR by the braking section) after setting of the threshold value KBP has become greater than or equal to the threshold value KBP.

In the hill-hold control, if the brake pedal 37 is released from depression after the vehicle has been stopped through the depression of the brake pedal 37, the braking force applied to each of the wheels FR, FL, RR, RL by the corresponding one of the wheel cylinders 36a to 36b is maintained in such a manner as to prevent the wheels FR, FL, RR, RL from rolling. Specifically, according to the hill-hold control, the CPU 60 maintains the normally open electromagnetic valves 42, 43, 46, 47 of the hydraulic circuits 33, 34 in an energized state. This maintains the brake fluid pressure BP in each wheel cylinder 36a to 36d.

The hill-hold control continues for a predetermined time (for example, approximately two seconds), after the brake pedal 37 has been released from depression. Therefore, after the predetermined time elapses since the brake pedal 37 has been released from depression, the hill-hold control is automatically suspended. That is, the electromagnetic valves 42, 43, 46, 47, which are normally open, are de-energized while the normally closed electromagnetic valves 44, 45, 48, 49 are energized. This decreases the brake fluid pressure BP in each wheel cylinder 36a to 36d. In other words, the CPU 60 unlocks (permits rotation of) the wheels FR, FL, RR, RL by reducing the braking force applied to the wheels FR, FL, RR, RL by the corresponding wheel cylinders 36a to 36d.

After the hill-hold control of step S33, the CPU 60 suspends the hill-hold control routine. Further, the hill-hold control is suspended once the CPU 60 detects depression of the accelerator pedal 17 in correspondence with a signal from the accelerator opening degree sensor SE1 when the threshold value setting routine or the hill-hold control routine is performed. Specifically, the CPU 60 clears the threshold value KBP and restores an initial setting state of the threshold value KBP.

The illustrated embodiment has the following advantages.

(1) After the threshold value KBP has been set, the brake fluid pressure BP of each wheel cylinder 36a to 36d (the braking force applied to each wheel FR, FL, RR, RL by the braking section) may be decreased through operation of the brake pedal 37. In this case, the reference brake fluid pressure (the reference braking force) BBP and the threshold value KBP are reset to smaller values corresponding to the decrease of the brake fluid pressure BP. That is, even after the threshold value KBP has been set to a relatively large value, the threshold value KBP is reset to a relatively small value in correspondence with the depression amount of the brake pedal 37. This enables the hill-hold control, which prevents the wheels FR, FL, RR, RL from rolling after the brake pedal 37 has been released from depression. Accordingly, the hill-hold control is reliably performed in response to depression of the brake pedal 37 intended to initiate such control.

(2) If the brake fluid pressure BP in each wheel cylinder 36a to 36d (the braking force applied to each wheel FR, FL, RR, RL by the braking section) decreases by the predetermined value SBP, the reference brake fluid pressure (the reference braking force) BBP and the threshold value KBP are reset. This reduces the load of the CPU 60, which functions as the reference braking force setting section and the threshold value setting section, compared to a case where the CPU 60 must continuously determine whether the reference brake fluid pressure BBP and the threshold value KBP should be reset.

(3) The reference brake fluid pressure (the reference braking force) BBP is reliably set to a value greater than or equal to the minimum brake fluid pressure (the minimum braking force) BPmin. The threshold value KBP is reliably set to a value greater than or equal to the value obtained by adding the minimum brake fluid pressure BPmin and the reference value BV together. This prevents unintended (erroneous) initiation of the hill-hold control, which may occur if the threshold value KBP is set to a relatively small value.

The present invention may be embodied in the following modified forms (embodiments).

The reference time BT may be prolonged if the inclination angle gr of the road surface on which the vehicle is stopped is relatively large, compared to a case where the inclination angle gr is relatively small. Specifically, the ROM 61 stores a map representing the relationship between the inclination angle gr of the road surface and the reference time BT. The reference time BT is read out from the map in correspondence with the inclination angle gr that has been detected immediately after the vehicle has been stopped. The reference brake fluid pressure BBP and the threshold value KBP are set to relatively large values if the reference time BT is set to a relatively large value, compared to a case where the reference time BT is set to a relatively small value. Accordingly, in the hill-hold control, the brake fluid pressure BP of each wheel cylinder 36a to 36d (the braking force applied to each wheel FR, FL, RR, RL by the braking section) increases if the inclination angle gr of the road surface is relatively large, compared to a case where the inclination angle gr is relatively small. In this regard, the CPU 60 of the illustrated embodiment functions as a reference time setting section (reference time setting means). If the inclination angle gr of the road surface on which the vehicle is stopped is relatively great, the reference time setting section sets the reference time BT to a value greater than a value corresponding to a relatively small inclination angle.

Setting of the minimum brake fluid pressure BPmin may be omitted from the illustrated embodiment.

Step S21 may be omitted from the threshold value setting routine. In this case, if the determination of step S20 is positive, the reference brake fluid pressure BBP of each wheel cylinder 36a to 36d is reset in step S22.

The ROM 61 may store a relational expression representing the relationship between the inclination angle gr of the road surface and the minimum brake fluid pressure BPmin of each wheel cylinder 36a to 36d, instead of the map of FIG. 3. The minimum brake fluid pressure BPmin is thus obtained using the relational expression.

The brake pedal 37 does not necessarily have to be a foot pedal type depressed by the driver but may be a manually operable brake pedal, which is operated by a hand.

In the illustrated embodiment, the present invention is applied to the braking force maintaining apparatus 11 of a front-wheel-drive vehicle. However, the braking force maintaining apparatus of the invention may be used in a rear-wheel-drive vehicle or in a four-wheel-drive vehicle.

The wheel cylinder 36a for the right front wheel FR and the wheel cylinder 36b for the left front wheel FL may be connected to the first hydraulic circuit 33. In this case, the wheel cylinder 36c for the right rear wheel RR and the wheel cylinder 36d for the left rear wheel RL are connected to the second hydraulic circuit 34.

The invention claimed is:

1. An apparatus for maintaining a braking force of a vehicle, comprising:
a reference braking force setting section that sets, as a reference braking force, a braking force applied by a braking section to wheels of the vehicle after a reference time has elapsed since stopping of the vehicle through application of the braking force to the wheels by the braking section;
a threshold value setting section that sets a threshold value by adding the reference braking force to a predetermined reference value;
a braking force determining section that determines whether the braking force applied by the braking section to the wheels through depression of a braking pedal of the vehicle after setting of the threshold value has become greater than or equal to the threshold value;
a control section that controls operation of the braking section in such a manner that, when the determination of the braking force determining section is positive, the braking force acting on the wheels is maintained for preventing rotation of the wheels regardless of release of the brake pedal from the depression;
a braking force change rate detecting section that detects a change rate of the braking force applied by the braking section to the wheels after the threshold value has been set; and
a change rate determining section that determines whether the change rate detected by the braking force change rate detecting section is a negative value,
wherein, if the determination of the change rate determining section is positive, the reference braking force setting section resets, as the reference braking force, the braking force applied by the braking section to the wheels after the threshold value has been set, and the threshold value setting section resets the threshold value by adding the reference braking force that has been reset by the reference braking force setting section to the reference value.

2. The apparatus according to claim 1, further comprising a braking force resetting determining section that, if the determination of the change rate determining section is positive, determines whether the braking force applied by the braking section to the wheels has become smaller than or equal to a value obtained by subtracting a predetermined value from the reference braking force,
wherein if the determination of the braking force resetting determining section is positive, the reference braking force setting section resets, as the reference braking force, the braking force applied by the braking section to the wheels after the threshold value has been set, and the threshold value setting section resets the threshold value by adding the reference braking force that has been reset by the reference braking force setting section to the reference value together.

3. The apparatus according to claim 1, further comprising:
a road surface inclination angle detecting section that detects an inclination angle of a road surface on which the vehicle has been stopped; and
a minimum braking force setting section that sets, as a minimum braking force, a minimum braking force applied by the braking section to the wheels that is necessary for stopping the vehicle on the road surface the inclination angle of which has been detected by the road surface inclination angle detecting section,
wherein, if the determination of the change rate determining section is positive and the braking force applied by the braking section to the wheels becomes less than the minimum braking force, the reference braking force setting section sets the minimum braking force as the reference braking force.

4. The apparatus according to claim 2, further comprising:
a road surface inclination angle detecting section that detects an inclination angle of a road surface on which the vehicle has been stopped; and
a minimum braking force setting section that sets, as a minimum braking force, a minimum braking force applied by the braking section to the wheels that is necessary for stopping the vehicle on the road surface the inclination angle of which has been detected by the road surface inclination angle detecting section, wherein, if the determination of the change rate determining section is positive and the braking force applied by the braking section to the wheels becomes less than the minimum braking force, the reference braking force setting section sets the minimum braking force as the reference braking force.

5. The apparatus according to claim 1, further comprising:
a road surface inclination angle detecting section that detects an inclination angle of a road surface on which the vehicle has been stopped; and
a reference time setting section that, if the inclination angle that has been detected by the road surface inclination angle detecting section is relatively great, sets the reference time to a value greater than a reference time that is set when the inclination angle is relatively small.

6. The apparatus according to claim 2, further comprising:
a road surface inclination angle detecting section that detects an inclination angle of a road surface on which the vehicle has been stopped; and
a reference time setting section that, if the inclination angle that has been detected by the road surface inclination angle detecting section is relatively great, sets the reference time to a value greater than a reference time that is set When the inclination angle is relatively small.

7. The apparatus according to claim 3, further comprising:
a reference time setting section that, if the inclination angle that has been detected by the road surface inclination angle detecting section is relatively great, sets the reference time to a value greater than a reference time that is set when the inclination angle is relatively small.

8. The apparatus according to claim 4, further comprising:
a reference time setting section that, if the inclination angle that has been detected by the road surface inclination angle detecting section is relatively great, sets the reference time to a value greater than a reference time that is set when the inclination angle is relatively small.

9. A method for maintaining a braking force of a vehicle, comprising:
setting a braking force acting on wheels of the vehicle after a reference time has elapsed since stopping of the vehicle through application of the braking force to the wheels as a reference braking force;
setting a threshold value by adding the reference braking force to a predetermined reference value;
determining whether the braking force acting on the wheels through depression of a brake pedal of the vehicle after setting of the threshold value has become greater than or equal to the threshold value, wherein, if the determination is positive, the braking force acting on the wheels is maintained for preventing rotation of the wheels regardless of release of the brake pedal from the depression; and
detecting a change rate of the braking force acting on the wheels after setting of the threshold value and determining whether the detected change rate is negative, wherein, if the determination is positive, the braking force acting on the wheels after setting of the threshold value is reset as the reference braking force and the threshold value is reset by adding the reset reference braking force to the reference value.

10. The method according to claim 9, wherein said detecting of the change rate of the braking force acting on the wheels after setting of the threshold value and determining whether the detected value is negative includes:
determining whether the braking force acting on the wheels has become smaller than or equal to a value obtained by subtracting a predetermined value from the reference braking force if the change rate of the braking force acting on the wheels after setting of the threshold value is negative, wherein, if the determination is positive, the braking force acting on the wheels after setting of the threshold value is reset as the reference braking force and the threshold value is reset by adding the reset reference braking force to the reference value.

11. The method according to claim 9, wherein said setting of the braking force acting on the wheels as the reference braking force includes:
detecting an inclination angle of a road surface on which the vehicle has been stopped;
setting a minimum braking force acting on the wheels necessary for stopping the vehicle on the road surface the inclination angle of which has been detected as a minimum braking force; and
setting the minimum braking force as the reference braking force if the change rate of the braking force acting on the wheels after setting of the threshold value is negative and the braking force acting on the wheels is less than the minimum braking force.

12. The method according to claim 10, wherein said setting of the braking force acting on the wheels as the reference braking force includes:
detecting an inclination angle of a road surface on which the vehicle has been stopped;
setting a minimum braking force acting on the wheels necessary for stopping the vehicle on the road surface the inclination angle of which has been detected as a minimum braking force; and
setting the minimum braking force as the reference braking force if the change rate of the braking force acting on the wheels after setting of the threshold value is negative and the braking force acting on the wheels is less than the minimum braking force.

13. The method according to claim 9, further comprising:
detecting an inclination angle of a road surface on which the vehicle has been stopped, wherein, if the inclination angle that has been detected is relatively great, the reference time is set to a value greater than a reference time that is set when the inclination angle is relatively small.

14. The method according to claim 10, further comprising:
detecting an inclination angle of a road surface on which the vehicle has been stopped, wherein, if the inclination angle that has been detected is relatively great, the reference time is set to a value greater than a reference time that is set when the inclination angle is relatively small.

15. The method according to claim 11, wherein, if the inclination angle that has been detected is relatively great, the reference time is set to a value greater than a reference time that is set when the inclination angle is relatively small.

16. The method according to claim 12, wherein, if the inclination angle that has been detected is relatively great, the reference time is set to a value greater than a reference time that is set when the inclination angle is relatively small.

* * * * *